United States Patent [19]

Hasebe

[11] Patent Number: 4,609,995
[45] Date of Patent: Sep. 2, 1986

[54] PRIORITY CONTROLLER

[75] Inventor: Kouki Hasebe, Tokyo, Japan

[73] Assignee: Tokyo Shibaura Denki Kabushiki Kaisha, Kawasaki, Japan

[21] Appl. No.: 505,172

[22] Filed: Jun. 17, 1983

[30] Foreign Application Priority Data

Jun. 25, 1982 [JP] Japan .................. 57-109511

[51] Int. Cl.⁴ .............................................. G06F 3/04
[52] U.S. Cl. .................................................. 364/900
[58] Field of Search ... 364/200 MS File, 900 MS File; 340/825.5

[56] References Cited

U.S. PATENT DOCUMENTS

| | | | |
|---|---|---|---|
| 3,925,766 | 12/1975 | Bardotti et al. | 364/200 |
| 4,009,470 | 2/1977 | Danilenko et al. | 364/200 |
| 4,121,285 | 10/1978 | Chen | 364/900 |
| 4,271,467 | 6/1981 | Holtey | 364/200 |
| 4,390,944 | 6/1983 | Quackenbush | 364/200 |
| 4,394,728 | 7/1983 | Comfort et al. | 364/200 |
| 4,408,300 | 10/1983 | Shima | 364/900 |

Primary Examiner—Raulfe B. Zache
Assistant Examiner—David Y. Eng
Attorney, Agent, or Firm—Cushman, Darby & Cushman

[57] ABSTRACT

A priority controller includes a pair of read only memories and a register. The register stores information identifying a request circuit to which priority has recently been granted. Corresponding locations of the two read only memories store identical data for determining priority. These read only memories are alternately enabled in accordance with the value of the most significant bit position of the information stored in the register. One of the read only memories is addressed by a first address signal consisting of the lower two bits of the register information and request signals REQ0–REQ7 supplied from eight request circuits. The other of the two read only memories is addressed by a second address obtained by exchanging the positions of the signals REQ0–REQ3 of the first address with signals REQ4–REQ7 of this first address. The information produced by the read only memory which is enabled indicates the request circuit to which priority is to be granted.

8 Claims, 7 Drawing Figures

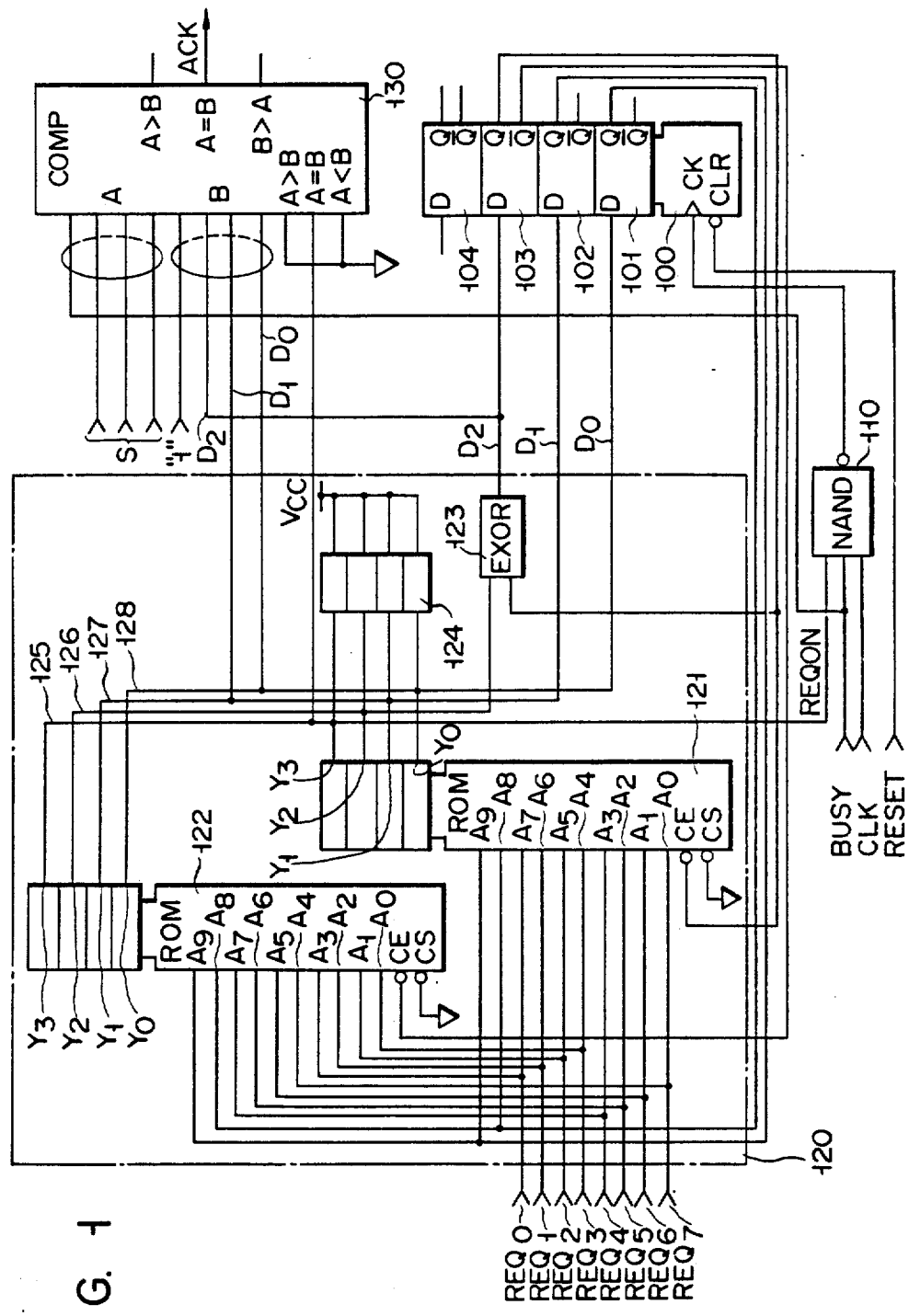
F I G. 1

F I G. 2a

| $A_{10}$ | $A_9$ | $A_8$ | $A_7$ | $A_6$ | $A_5$ | $A_4$ | $A_3$ | $A_2$ | $A_1$ | $A_0$ | $Y_3$ | $Y_2$ | $Y_1$ | $Y_0$ |
|---|---|---|---|---|---|---|---|---|---|---|---|---|---|---|
| 0 | 0 | 0 | 0 | × | × | × | × | × | × | × | 1 | 1 | 1 | 1 |
| | | | 1 | 0 | × | × | × | × | × | × | | 1 | 1 | 0 |
| | | | 1 | 1 | 0 | × | × | × | × | × | | 1 | 0 | 1 |
| | | | 1 | 1 | 1 | 0 | × | × | × | × | | 1 | 0 | 0 |
| | | | 1 | 1 | 1 | 1 | 0 | × | × | × | | 0 | 1 | 1 |
| | | | 1 | 1 | 1 | 1 | 1 | 0 | × | × | | 0 | 1 | 0 |
| | | | 1 | 1 | 1 | 1 | 1 | 1 | 0 | × | | 0 | 0 | 1 |
| | | | 1 | 1 | 1 | 1 | 1 | 1 | 1 | 0 | | 0 | 0 | 0 |
| 0 | 0 | 1 | 0 | × | × | × | × | × | × | 1 | 1 | 1 | 1 | 1 |
| | | | 1 | 0 | × | × | × | × | × | 1 | | 1 | 1 | 0 |
| | | | 1 | 1 | 0 | × | × | × | × | 1 | | 1 | 0 | 1 |
| | | | 1 | 1 | 1 | 0 | × | × | × | 1 | | 1 | 0 | 0 |
| | | | 1 | 1 | 1 | 1 | 0 | × | × | 1 | | 0 | 1 | 1 |
| | | | 1 | 1 | 1 | 1 | 1 | 0 | × | 1 | | 0 | 1 | 0 |
| | | | 1 | 1 | 1 | 1 | 1 | 1 | 0 | 1 | | 0 | 0 | 1 |
| | | | × | × | × | × | × | × | × | 0 | | 0 | 0 | 0 |

FIG. 2b

| $A_{10}$ | $A_9$ | $A_8$ | $A_7$ | $A_6$ | $A_5$ | $A_4$ | $A_3$ | $A_2$ | $A_1$ | $A_0$ | $Y_3$ | $Y_2$ | $Y_1$ | $Y_0$ |
|---|---|---|---|---|---|---|---|---|---|---|---|---|---|---|
| 0 | 1 | 0 | O | × | × | × | × | × | 1 | 1 | 1 | 1 | 1 | 1 |
| | | | 1 | O | × | × | × | × | 1 | 1 | | 1 | 1 | 0 |
| | | | 1 | 1 | O | × | × | × | 1 | 1 | | 1 | 0 | 1 |
| | | | 1 | 1 | 1 | O | × | × | 1 | 1 | | 1 | 0 | 0 |
| | | | 1 | 1 | 1 | 1 | O | × | 1 | 1 | | 0 | 1 | 1 |
| | | | 1 | 1 | 1 | 1 | 1 | O | 1 | 1 | | 0 | 1 | 0 |
| | | | × | × | × | × | × | × | O | × | | 0 | 0 | 1 |
| | | | × | × | × | × | × | × | 1 | O | | 0 | 0 | 0 |
| 0 | 1 | 1 | O | × | × | × | × | 1 | 1 | 1 | 1 | 1 | 1 | 1 |
| | | | 1 | O | × | × | × | 1 | 1 | 1 | | 1 | 1 | 0 |
| | | | 1 | 1 | O | × | × | 1 | 1 | 1 | | 1 | 0 | 1 |
| | | | 1 | 1 | 1 | O | × | 1 | 1 | 1 | | 1 | 0 | 0 |
| | | | 1 | 1 | 1 | 1 | O | 1 | 1 | 1 | | 0 | 1 | 1 |
| | | | × | × | × | × | × | O | × | × | | 0 | 1 | 0 |
| | | | × | × | × | × | × | 1 | O | × | | 0 | 0 | 1 |
| | | | × | × | × | × | × | 1 | 1 | O | | 0 | 0 | 0 |
| 0 | × | × | 1 | 1 | 1 | 1 | 1 | 1 | 1 | 1 | 0 | × | × | × |

FIG. 3a

| $A_{10}$ | $A_9$ | $A_8$ | $A_3$ | $A_2$ | $A_1$ | $A_0$ | $A_7$ | $A_6$ | $A_5$ | $A_4$ | $Y_3$ | $Y_2$ | $Y_1$ | $Y_0$ |
|---|---|---|---|---|---|---|---|---|---|---|---|---|---|---|
| | | | O | X | X | X | 1 | 1 | 1 | 1 | | O | 1 | 1 |
| | | | 1 | O | X | X | 1 | 1 | 1 | 1 | | O | 1 | O |
| | | | 1 | 1 | O | X | 1 | 1 | 1 | 1 | | O | O | 1 |
| 1 | O | O | 1 | 1 | 1 | O | 1 | 1 | 1 | 1 | 1 | O | O | O |
| | | | X | X | X | X | O | X | X | X | | 1 | 1 | 1 |
| | | | X | X | X | X | 1 | O | X | X | | 1 | 1 | O |
| | | | X | X | X | X | 1 | 1 | O | X | | 1 | O | 1 |
| | | | X | X | X | X | 1 | 1 | 1 | O | | 1 | O | O |
| | | | O | X | X | 1 | 1 | 1 | 1 | 1 | | O | 1 | 1 |
| | | | 1 | O | X | 1 | 1 | 1 | 1 | 1 | | O | 1 | O |
| | | | 1 | 1 | O | 1 | 1 | 1 | 1 | 1 | | O | O | 1 |
| 1 | O | 1 | X | X | X | O | X | X | X | X | 1 | O | O | O |
| | | | X | X | X | 1 | O | X | X | X | | 1 | 1 | 1 |
| | | | X | X | X | 1 | 1 | O | X | X | | 1 | 1 | O |
| | | | X | X | X | 1 | 1 | 1 | O | X | | 1 | O | 1 |
| | | | X | X | X | 1 | 1 | 1 | 1 | O | | 1 | O | O |

FIG. 3b

| A$_{10}$ | A$_9$ | A$_8$ | A$_3$ | A$_2$ | A$_1$ | A$_0$ | A$_7$ | A$_6$ | A$_5$ | A$_4$ | Y$_3$ | Y$_2$ | Y$_1$ | Y$_0$ |
|---|---|---|---|---|---|---|---|---|---|---|---|---|---|---|
| | | | O | X | 1 | 1 | 1 | 1 | 1 | 1 | | O | 1 | 1 |
| | | | 1 | O | 1 | 1 | 1 | 1 | 1 | 1 | | O | 1 | O |
| | | | X | X | O | X | X | X | X | X | | O | O | 1 |
| 1 | 1 | O | X | X | 1 | O | X | X | X | X | 1 | O | O | O |
| | | | X | X | 1 | 1 | O | X | X | X | | 1 | 1 | 1 |
| | | | X | X | 1 | 1 | 1 | O | X | X | | 1 | 1 | O |
| | | | X | X | 1 | 1 | 1 | 1 | O | X | | 1 | O | 1 |
| | | | X | X | 1 | 1 | 1 | 1 | 1 | O | | 1 | O | O |
| | | | O | 1 | 1 | 1 | 1 | 1 | 1 | 1 | | O | 1 | 1 |
| | | | X | O | X | X | X | X | X | X | | O | 1 | O |
| | | | X | 1 | O | X | X | X | X | X | | O | O | 1 |
| 1 | 1 | 1 | X | 1 | 1 | O | X | X | X | X | 1 | O | O | O |
| | | | X | 1 | 1 | 1 | O | X | X | X | | 1 | 1 | 1 |
| | | | X | 1 | 1 | 1 | 1 | O | X | X | | 1 | 1 | O |
| | | | X | 1 | 1 | 1 | 1 | 1 | O | X | | 1 | O | 1 |
| | | | X | 1 | 1 | 1 | 1 | 1 | 1 | O | | 1 | O | O |
| 1 | X | X | 1 | 1 | 1 | 1 | 1 | 1 | 1 | 1 | O | X | X | X |

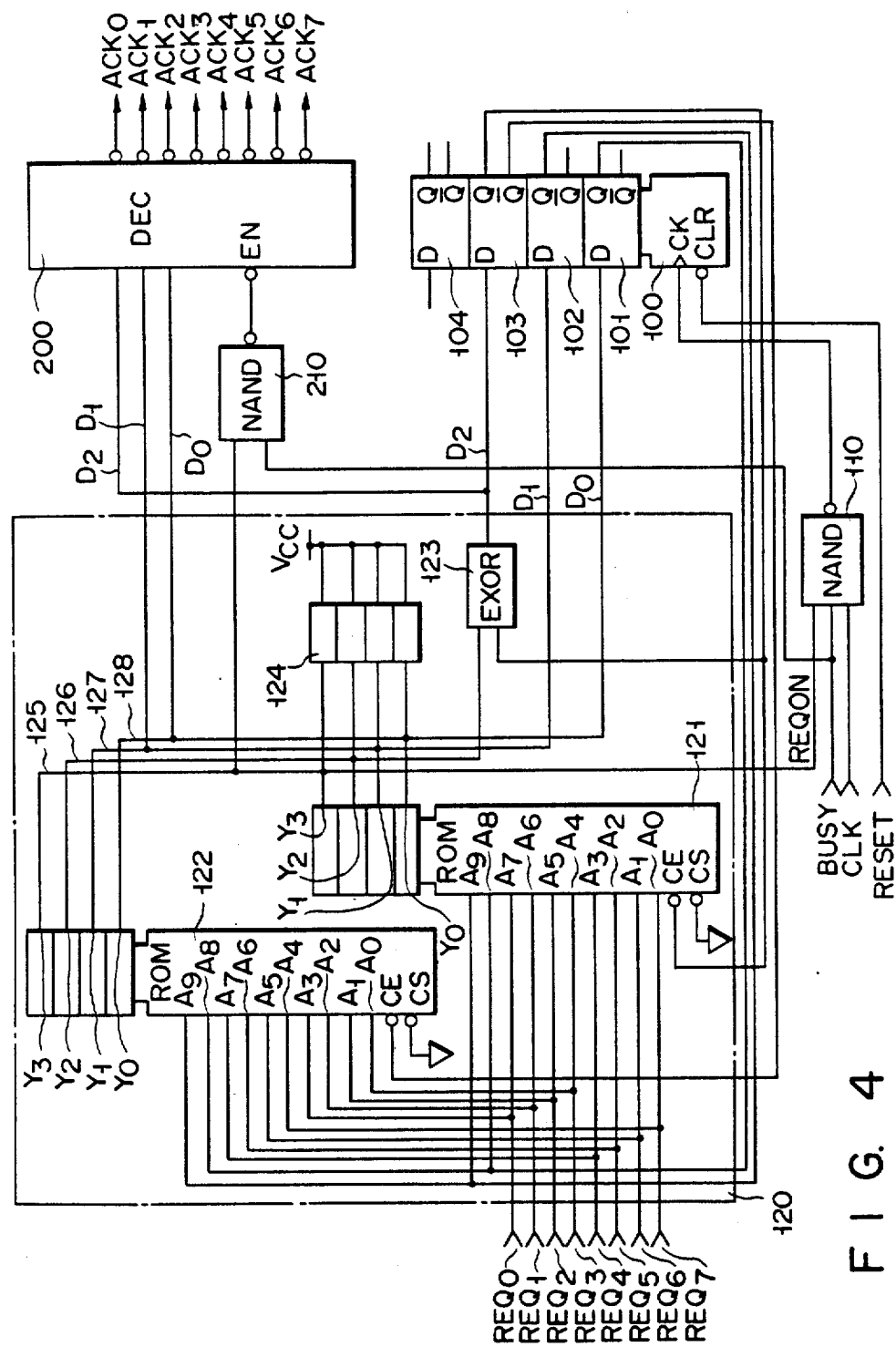
F I G. 4

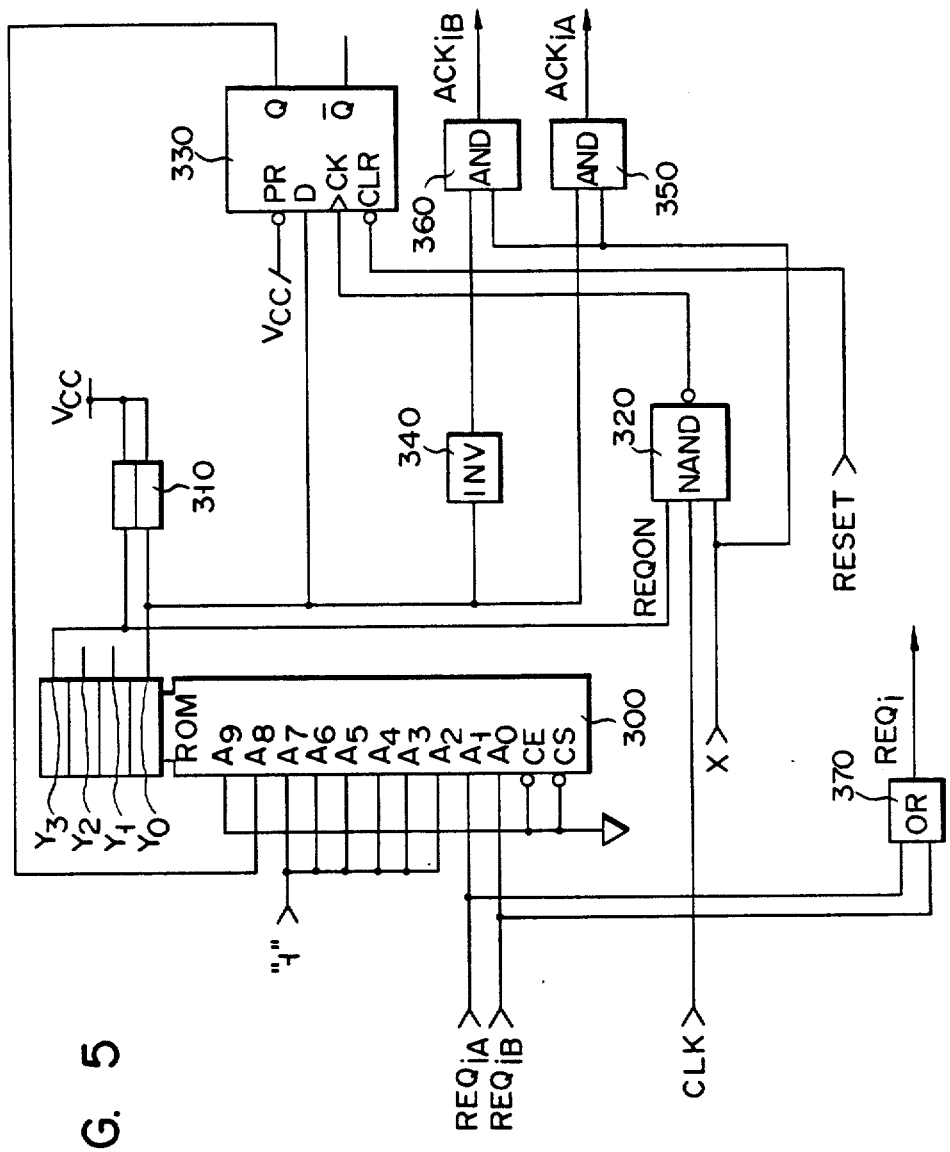
F I G. 5

PRIORITY CONTROLLER

BACKGROUND OF THE INVENTION

The present invention relates to a priority controller for determining priorities of request signals from a plurality of request circuits so as to select the request circuit having the highest priority.

In general, in acquisition control and interrupt control of a main memory or a system bus in a data processing system, a circuit (i.e., controlling means) is required to determine the priority levels of request signals from a plurality of request circuits (i.e., request devices) and then to find the priorities of the request circuits. Two priority determining systems are generally known. One of them comprises gate circuits which predetermine the relative priority levels of request signals from request circuits. The other system is of a daisy-chaining type and includes request circuits, in which an acknowledge signal is transferred from a common module to the original request circuit through any other request circuits which precede the original request circuit. More specifically, each of the request circuits preceding the original request circuit receives the acknowledge signal from the immediately preceding one and sends it to the immediately following request circuit. In the daisy-chaining system, any request circuit that receives the acknowledge signal has a higher priority than the immediately following request circuit.

However, these two types of priority determining systems cannot modify the priority levels, resulting in poor flexibility in acquisition control and interrupt control of the main memory and the system bus. A low-priority request circuit (request device) must often wait for a long period until its request is permitted. As a result, a plurality of request circuits having a time limit cannot be used. In particular, in the second priority determining system, it takes a long time to transmit the acknowledge signal to the original request circuit.

SUMMARY OF THE INVENTION

It is an object of the present invention to provide a priority controller for statically modifying priority levels of request circuits in accordance with identification data indicating the request circuit having the highest priority at a given time.

In order to achieve the above and other objects of the present invention, there is provided a priority controller comprising: register means for storing identification data indicating one of request circuits which has the highest priority at a given time; a priority encoder for determining the priority levels of request signals from the request circuits according to the request signals and the data stored in said register means, to thereby produce identification data indicating the request circuit which has the highest priority at a time after said given time; controlling means for causing said register means to store the identification data from said priority encoder; and determining means for determining the request circuit having the updated highest priority in accordance with the identification data from said priority encoder.

BRIEF DESCRIPTION OF THE DRAWINGS

FIG. 1 is a block diagram of a priority controller according to an embodiment of the present invention;

FIGS. 2a and 2b and FIGS. 3a and 3b are tables showing the relationships between the ROM addresses and the ROM readout data of two ROMs shown in FIG. 1, respectively;

FIG. 4 is a block diagram of a priority controller according to another embodiment of the present invention; and FIG. 5 is a block diagram of a priority controller according to still another embodiment of the present invention.

DETAILED DESCRIPTION OF THE PREFERRED EMBODIMENTS

FIG. 1 shows an 8-input priority controller according to a first embodiment of the present invention. The priority controller is arranged in each of eight request circuits (not shown) which use a common module (not shown). A 4-bit register 100 comprises four D flip-flops (to be referred to as F/Fs hereinafter) 101 to 104. In this embodiment, three F/Fs 101 to 103 are used. A data input terminal D of each of the F/Fs 101 to 103 receives 1-bit data of 3-bit request circuit number data "$D_0D_1D_2$" indicating the highest-priority request circuit from a priority encoder 120 to be described later. A gate circuit (e.g., NAND gate) 110 receives a reference clock signal CLK, a busy signal BUSY (indicating that the common module is being used by a given request circuit), and a request ON signal REQON (to be described later) from the priority encoder 120. An output signal from the NAND gate 110 is supplied to a clock input terminal CK of the register 100. A clear input terminal CLR of the register 100 receives a reset signal RESET.

The priority encoder 120 has ROMs (read-only memories) 121 and 122, an exclusive OR circuit (to be referred to as an EX-OR hereinafter) 123, and pull-up resistors 124. Each of the ROMs 121 and 122 has address input terminals $A_0$ to $A_9$, a chip enable terminal CE, and data output terminals $Y_0$ to $Y_3$. The address input terminals $A_0$ to $A_7$ of the ROM 121 receive request signals REQ7 to REQ0 (request ON at logic level "0") from request circuits "7" to "0" (not shown), respectively. Address input terminals $A_8$ and $A_9$ of the ROM 121 receive Q outputs from the F/Fs 101 and 102, respectively. The request signals REQ3 to REQ0 are supplied to the address input terminals $A_0$ to $A_3$ of the ROM 122, and the request signals REQ7 to REQ4 are supplied to the address input terminals $A_4$ to $A_7$ thereof, respectively. The address input terminals $A_8$ and $A_9$ of the ROM 122 receive the Q outputs from the F/Fs 101 and 102, respectively. In this embodiment, it should be noted that the request signals REQ0 to REQ7 supplied to the address input terminals $A_7$ to $A_0$ of the ROM 121 are reversed in the order of bit positions of the address input terminals $A_7$ to $A_0$ of the ROM 122 in units of four bits (REQ0 to REQ3, and REQ4 to REQ7). A Q output (first specific bit signal) from the F/F 103 is supplied to the chip enable terminal CE of the ROM 121. A $\bar{Q}$ output from the F/F 103 is supplied to the chip enable terminal CE of the ROM 122. When the Q output from the F/F 103 is set at logic level "0" (i.e., Q="0"), the ROM 121 is enabled. However, when the Q output from the F/F 103 is set at logic level "1" (i.e., Q="1"), the ROM 122 is enabled. This indicates that the Q output from the F/F 103 corresponds to the most significant bit of the addresses of a single ROM having address input terminals $A_0$ to $A_{10}$ when such a single ROM is used in place of the ROMs 121 and 122. The Q output from the F/F 103 can be supplied to the address input terminal $A_{10}$ of such a single ROM.

A $Y_3$ output (second specific bit) among the outputs ($Y_3$ to $Y_0$ outputs) from data output terminals $Y_3$ to $Y_0$ of each of the ROMs 121 and 122 indicates the presence or absence of a request circuit which is in the request status. The $Y_2$ to $Y_0$ outputs directly or indirectly indicate request circuit number data of a highest priority circuit "i" (where i is one of the numbers 0 to 7). FIGS. 2a and 2b show relationships between the address inputs ($A_9$ to $A_0$ inputs) and ROM readout contents ($Y_3$ to $Y_0$ outputs) of the ROM 121, respectively. It should be noted that the $A_{10}$ input is illustrated as part of the ROM addresses in FIGS. 2a and 2b.

Referring to FIGS. 2a and 2b, the $A_{10}$ input indicates the Q output from the F/F 103 (i.e., the virtual MSB of the ROM addresses representing the operating mode of the ROM 121). Referring to FIGS. 2a and 2b, the $A_7$ to $A_0$ inputs correspond to the request signals REQ0 to REQ7, respectively, as previously mentioned, and are general request inputs in the first priority determining system described in the "Background of the Invention". On the other hand, the $A_{10}$ to $A_8$ inputs correspond to contents (request circuit number data showing the request circuits "i" having the highest priority at present) stored in the register 100. This indicates that the priority is determined by taking into account which one of the request circuits is currently using the common module. Referring to FIGS. 2a and 2b, reference symbol x indicates an irrelevant logic state (i.e., the logic level can be either "1" or "0").

The relationship between the address inputs ($A_9$ to $A_0$ inputs) of the ROM 122 and the ROM contents ($Y_3$ to $Y_0$ outputs) of the ROM 122 will now be described. According to this embodiment, the contents of the ROM 122 are the same as those of the ROM 121. However, as previously described, the ROMs 121 and 122 may not be simultaneously enabled. The address contents of the ROM 121 partially differ from those of the ROM 122. In the ROM 121, the request signals REQ0 to REQ3 are the $A_7$ to $A_4$ inputs, and the request signals REQ4 to REQ7 are the $A_3$ to $A_0$ inputs. However, in the ROM 122, the request signals REQ0 to REQ3 are the $A_3$ to $A_0$ inputs, and the request signals REQ4 to REQ7 are the $A_7$ to $A_4$ inputs. The relationships between the address inputs ($A_9$ to $A_0$ inputs) and the readout data ($Y_3$ to $Y_0$ outputs) of the ROM 122 are respectively shown in FIGS. 3a and 3b. In FIGS. 3a and 3b, the data take different positions from those shown in FIGS. 2a and 2b. This is because the relationship between the request signals REQ0 to REQ7 on the one hand and the address input terminals $A_7$ to $A_0$ on the other is different. It should be noted that the $A_{10}$ input is assigned as the virtual MSB of the ROM addresses in the same manner as in FIGS. 2a and 2b. However, since the ROM 122 is enabled when the Q output from the F/F 103 is set at logic level "1", $A_{10}$ ="1" in FIGS. 3a and 3b.

Referring again to FIG. 1, the $Y_3$ outputs from the ROMs 121 and 122 are wire-ORed through a signal line 125, and the wired-OR signal is then supplied as the request ON signal REQON to the NAND gate 110. This signal REQON indicates the presence or absence of a request circuit which is in the request status. The $Y_2$ outputs from the ROMs 121 and 122 are wire-ORed through a signal line 126, and the wired-OR signal is supplied to one input terminal of the EX-OR 123. The Q output from the F/F 103 is supplied to the other input terminal of the EX-OR 123. The output from the EX-OR 123 is used as the MSB $D_2$ of the 3-bit request circuit number data indicating the request circuit "i" having the highest priority. The second significant bit $D_1$ of the request circuit number data is obtained by wire-ORing the $Y_1$ outputs from the ROMs 121 and 122 through a signal line 127. The LSB $D_0$ of the data is obtained by wire-ORing the $Y_0$ outputs from the ROMs 121 and 122 through a signal line 128. It should be noted that the 3-bit request circuit number data (identification data) for the request circuits "0" to "7" are "000", "001", "010", ..., and "111", respectively. The request circuit number data "$D_2D_1D_0$", which indicates the number of the highest priority request circuit and is assigned by the priority encoder 120, is supplied to the register 100. The request circuit number data "$D_2D_1D_0$" is linked with 1-bit logic level "1" data, and composite data is supplied to one set B of input terminals of a comparator (to be referred to as a COMP hereinafter) 130. The busy signal BUSY and specific request circuit number data S indicating the request circuit including the priority controller shown in FIG. 1 are supplied to the other set A of the COMP 130. The COMP 130 compares the A and B inputs and detects coincidence/noncoincidence. For this purpose, the COMP 130 has three mode selection terminals A>B, A<B, and A=B. The mode selection terminals A>B and A<B of the COMP 130 are set at logic level "0", and the mode selection terminal A=B receives the request ON signal REQON. In this embodiment, the COMP 130 is used as a coincidence/noncoincidence circuit. During coincidence detection, the COMP 130 generates the acknowledge signal of logic level "1" from the output terminal A=B thereof.

The operation of the priority controller having the arrangement described above will now be described hereinafter. In the initial status, the register 100 is cleared by the reset signal RESET. As a result, all the Q outputs from the F/Fs 101 to 103 are set at logic level "0". The Q output (Q="0") from the F/F 103 is supplied to the chip enable terminal CE of the ROM 121. The $\bar{Q}$ output ($\bar{Q}$="1") from the F/F 103 is supplied to the chip enable terminal CE of the ROM 122. The Q outputs (Q="0") from the F/Fs 102 and 101 are supplied to the address input terminals $A_9$ and $A_8$ of each of the ROMs 121 and 122, respectively. When the Q output from the F/F 103 is set at logic level "0", the CE input of the ROM 121 is set at logic level "0", thereby selecting the ROM 121. When the ROM 121 is selected (i.e., when the virtual $A_{10}$ input to the address input terminal $A_{10}$ of the addresses of the ROM is set at logic level "0") and when the $A_9$ and $A_8$ are set at logic level "0", the request circuit "7" has the highest priority, the subsequent request circuits have successively lower priorities, and the request circuit "0" has the lowest priority in accordance with the $Y_2$ to $Y_0$ outputs from the ROM 121, as may be apparent from FIG. 2a.

Now assume that the request circuits "i" and "j" (where i and j are each one of the request circuits "0" to "7" and i is not equal to j) simultaneously produce request signals REQi and REQj. Also, assume that the $Y_2$ to $Y_0$ outputs (indicating that a higher priority request circuit is given as the request circuit "i" at this moment) and the $Y_3$ output of logic level "1" are read out from the ROM 121. The $Y_2$ output among the $Y_2$ to $Y_0$ outputs is supplied to one input terminal of the EX-OR 123. The other input terminal of the EX-OR 123 receives the Q output from the F/F 103. In this case, the Q output from the F/F 103 is at logic level "0", so that the EX-OR 123 delivers the $Y_2$ output. Linked data of the output ($Y_2$ output) from the EX-OR 123 and the $Y_1$ and $Y_0$ outputs from the ROM 121 are supplied as request circuit number data "$D_2D_1D_0$" indicating the highest priority request circuit assigned by the priority encoder 120 to the COMP 130 and the register 100.

The COMP 130 has sets A and B of input terminals as previously described. The set B of input terminals receives data obtained by linking the request circuit number data "$D_2D_1D_0$" with 1-bit data of logic level "1". The set A of input terminals receives data obtained by linking the specific request circuit number data S, which is inherent in the request circuit including the priority controller shown in FIG. 1, with the busy signal BUSY. The mode selection terminal A=B of the COMP 130 receives the output (request ON signal REQON) obtained by wire-ORing $Y_3$ outputs from the ROMs 121 and 122. In this case, the $Y_3$ output from the ROM 121 is at logic level "1", so that the request ON signal REQON is set at logic level "1". If REQON="1", the COMP 130 detects coincidence/noncoincidence between the linked data of the request circuit number data "$D_2D_1D_0$" and the 1-bit data of logic level "1", and the linked data of the request circuit number data S and the busy signal BUSY. The busy signal BUSY indicates whether or not the common module is being used. When the signal is set at logic level "0", it indicates that the common module is being used ("busy"), and if it is set at "1" it indicates that the common module is not being used. If BUSY="1", then the COMP 130 detects meaningful coincidence/noncoincidence. The COMP 130 in the priority controller which is arranged in the request circuit "i" detects coincidence when the condition BUSY="1" is satisfied, and produces an acknowledge signal ACK. The request circuit "i" checks the acknowledge signal ACK at a timing of, for example, the reference clock signal CLK. Before the next reference clock timing, the busy signal BUSY goes to logic level "0" (busy status), so that the request circuit "i" can exclusively use the common module. The above-mentioned check can be performed using a D flip-flop which receives the acknowledge signal ACK as its D input and the reference clock signal CLK as its clock input.

For the following reasons the COMP 130 is arranged such that coincidence/noncoincidence detection is performed during the time when REQON="1" and that meaningful coincidence/noncoincidence detection is performed when BUSY="1". First, when the COMP 130 detects a coincidence in the busy mode, the common module is being used by a plurality of request circuits, resulting in erroneous operation. In order to prevent this drawback, the above arrangement is utilized. Second, assume that the COMP 130 detects a coincidence while there is no request circuit in the request mode. If this request circuit which is not set in the request mode generates a request signal, this request circuit uses the common module before priority determination is performed by the priority encoder 120, which results in problems. The above arrangement is utilized in order to eliminate such problems. However, even if the COMP 130 always detects coincidence/noncoincidence between the request circuit number data "$D_2D_1D_0$" and the specific request circuit number data S, the above drawbacks can be eliminated when a gate circuit is added to gate the acknowledge signal ACK in accordance with the logic levels of the busy signal BUSY and the request ON signal REQON. The gate circuit need not be arranged in the priority controller. In the arrangement wherein the acknowledge signal ACK is checked at the timing of the reference clock signal CLK as described above, the request ON signal REQON need not be the condition for coincidence/noncoincidence or the gating condition.

The request circuit number data "$D_2D_1D_0$" supplied to the register 100 is stored therein at a trailing edge of the reference clock signal CLK when BUSY="1", in accordance with the output signal from the NAND gate 110. The contents of the register 100 indicate the request circuit "i" which is using the common module at present. The contents of the register 100 which indicate the request circuit "i" are supplied as 3-bit $A_{10}A_9A_8$ inputs to each of the ROMs 121 and 122. As may be apparent from FIGS. 2a and 2b and FIGS. 3a and 3b, if the binary $A_{10}A_9A_8$ input is i in decimal notation, the priority encoder 120 performs encoding such that the request circuit "i" has the lowest priority. Therefore, the previously produced request signal REQj has a priority higher than that of the request signal REQi at this time.

Assume that i is given as 4 (decimal), that is, the content (37 $A_{10}A_9A_8$") of the register 100 is "100" (binary). Since the input address terminal $A_{10}$ is at logic level "1", the ROM 122 is selected at this time. In this case, the $Y_2$ output from the ROM 122 is inverted by the EX-OR 123. A $Y_2$ output is produced as the MSB $D_2$ of the present highest-priority assigned request circuit number data. Therefore, if $A_{10}$ ="1", then the priority encoder 120 produces binary data "$Y_2Y_1Y_0$" wherein only the $Y_2$ output is inverted among the $Y_2$ to $Y_0$ outputs shown in FIGS. 3a and 3b. In this case, a request circuit "4" (i.e., a request signal REQ4) has the lowest priority. As may be apparent from FIGS. 2a and 2b and FIGS. 3a and 3b, since the $Y_2$ output is inverted to obtain the data "$Y_2Y_1Y_0$" (FIGS. 3a and 3b) and the $A_{10}$ input is regarded as the MSB of the addresses, the data in FIGS. 3a and 3b can be regarded as a continuous part of the data in FIGS. 2a and 2b. In other words, assume that the priority encoder 120 comprises a single ROM which has two blocks of the same size. The input/output relationship shown in FIGS. 2a and 2b corresponds to one of the blocks which has the MSB ($A_{10}$) of logic level "0", and the input/output relationship shown in FIGS. 3a and 3b corresponds to the other block which has the MSB ($A_{10}$) of logic level "1" wherein the $Y_2$ output (FIGS. 2a and 2b) is inverted to the $Y_2$ output (FIGS. 3a and 3b). According to this embodiment, the input/output relationships shown in FIGS. 2a and 2b and FIGS. 3a and 3b are realized by small ROMs 121 and 122 in place of a single large ROM. The set of upper bits and the set of lower bits of the request inputs (request signals REQ0 to REQ7) as part of the address inputs to each of the ROMs 121 and 122 are exchanged in the ROMs 121 and 122. Furthermore, the $Y_2$ output level of the ROM 122 is inverted by the EX-OR 123. In this manner, even though the same contents of the ROMs 121 and 122 are used, the two types of input/output relationships are obtained. For this reason, general ROMs are conveniently used to obtain the ROMs 121 and 122.

When the request circuits "i" and "j" simultaneously generate the request signals REQi and REQj, and the request signal REQi from the request circuit "i" is accepted, the request circuit "i" is assigned the lowest priority. The previously-generated request signal REQj has a higher priority than the request signal REQi. If a request signal REQk which has a higher priority than the request signal REQj is generated, the request signal REQj (request circuit "j") will then have a priority higher than those of the signals REQi and REQk from the request circuits "i" and "k" when the request signal REQk from the request circuit "k" receives its priority. Therefore, the request signal REQj has the highest priority at least once in an 8-time cycle (i.e., data "$A_1$. $_0A_9A_8$" takes one of 8 binary data "000" to "111"). According to this embodiment, the 8 request circuits have equal probabilities of obtaining a corresponding priority. Therefore, a plurality of request circuits having a time limit can be used. Furthermore, the content at the ROM addresses indicated by data which is obtained by linking the $A_{10}$ to $A_8$ inputs indicating the last request circuit having the right to use the common module with the $A_7$ to $A_0$ inputs becomes the highest priority request circuit number data, thereby performing priority determination at a high speed. Furthermore, according to this embodiment, if a single ROM (comprising the ROM 121 and 122) is divided into 8 blocks, each of which has a predetermined priority and is used as a priority encoder, eight different priority encoders are selectively used with the $A_{10}$ to $A_8$ inputs, thereby statically performing cyclical priority control. As a result, the circuit arrangement becomes simple.

A priority controller according to a second embodiment of the present invention will be described with reference to FIG. 4. The same reference numerals as used in FIG. 1 denote the same parts in FIG. 4, and so a detailed description thereof will be omitted. The priority controller shown in FIG. 4 is substantially the same as that shown in FIG. 1, except that only one priority controller (FIG. 4) is arranged therein in the common module, while one priority controller (FIG. 1) is arranged in each of the request circuits. Referring to FIG. 4, a decoder (DEC) 200 is used in place of the COMP 130 shown in FIG. 1. A NAND gate 210 is newly added in the circuit arrangement shown in FIG. 4. The NAND gate 210 receives a busy signal BUSY and a signal (request ON signal) REQON obtained by wire-ORing the $Y_3$ signals from the ROMs 121 and 122. If BUSY="1" and REQON="1" (i.e., if the common module is in the ready mode and one of the request signals REQ0 to REQ7 is effective or at logic level "0"), the NAND gate 210 produces a signal of logic level "0". The output signal from the NAND gate 210 is supplied to an enable terminal EN of the decoder 200. A code input terminal of the decoder 200 receives 3-bit request circuit number data "$D_2D_1D_0$" from the priority encoder 120. The decoder 200 decodes the number data "$D_2D_1D_0$" and supplies a decoded signal as an acknowledge signal ACKi (where i is one of 0 to 7) to a corresponding request circuit "i" during a time interval in which the output signal from the NAND gate 210 is set at logic level "0". The operation of the request circuit "i" receiving the acknowledge signal ACKi is the same as that described with reference to the first embodiment. However, according to the second embodiment, only one priority controller is arranged in the common module (i.e. only one priority controller per system), unlike the system described with reference to the first embodiment. As a result, although 8 signal lines are required for transferring the acknowledge signal ACKi, the number of priority controllers is reduced from eight to one. However, the decoder 200 may be separated from the priority controller shown in FIG. 4 and one such decoder may be arranged in each request circuit. In this case, three signal lines for transmitting the request circuit number data "$D_2D_1D_0$" may be used instead of using 8 signal lines for transferring the acknowledge signal ACKi.

A priority controller according to a third embodiment of the present invention will now be described with reference to FIG. 5. FIG. 5 shows a 2-input priority controller. This priority controller may be cascade-connected to the priority controller shown in FIG. 1 or 4, thereby obtaining a 16-input priority controller to be described later. Referring to FIG. 5, a ROM 300 has the same contents as the ROMs 121 and 122 shown in FIG. 4. Address input terminals $A_1$ and $A_0$ receive request signals REQi$_A$ and REQi$_B$ from request circuits "i$_A$" and "i$_B$" (not shown), respectively. A content of a register 330 (to be described later) is supplied to an address input terminal $A_8$. The CE input of the ROM 300 (i.e., the $A_{10}$ and $A_9$ inputs) is set at logic level "0" (constant), and the $A_7$ to $A_2$ inputs are set at logic level "1" (constant). In this case, if $A_8 = $ "0", then data "$A_{10}A_9A_8$" = "000". As may be apparent from FIG. 2a, the request signal REQi$_A$ then has a higher priority than the request signal REQi$_B$. However, if $A_8 = $ "1", the data "$A_{10}A_9A_8$" = "001". The request signal REQi$_B$ then has a higher priority than the request signal REQi$_A$. Therefore, the priority changes in accordance with a change in the logic level of the $A_8$ input.

A power source voltage VCC is supplied to the data output terminals $Y_0$ and $Y_3$ of the ROM 300 through resistors 310. A NAND gate 320 receives the request ON signal REQON as the $Y_3$ output from the ROM 300, the reference clock signal CLK, and a signal X. The signal X corresponds to either the busy signal BUSY, the acknowledge signal ACK (FIG. 1), or the acknowledge signal ACKi (FIG. 4). When the controller shown in FIG. 5 is used as a two-input priority controller, the busy signal BUSY is used as the signal X. However, in the 16-input priority controller combined with the priority controller (FIG. 1 or 4), the acknowledge signal ACK or ACKi is used as the signal X.

The register 330 comprises, for example, a D flip-flop. The register 330 stores the $Y_0$ output from the ROM 300 at a leading edge of the output from the NAND gate 320. The data from the register 330 is supplied to the address input terminal $A_8$ of the ROM 300. The $Y_0$ output from the ROM 300 is also supplied to an inverter (INV) 340 and an AND gate 350. The AND gate 350 also receives the signal X. The output signal from the inverter 340 (inverting the $Y_0$ output from the ROM 300) is supplied to an AND gate 360. The AND gate 360 also receives the signal X. The AND gate 350 supplies a valid (logic level "1") acknowledge signal ACKi$_A$ to the request circuit "i$_A$" while input signals of logic level "1" are supplied thereto. Similarly, the AND gate 360 supplies a valid (logic level "1") acknowledge signal ACKi$_B$ to the request circuit "i$_B$" while input signals of logic level "1" are supplied thereto. An OR gate 370 receives the request signals REQi$_A$ and REQi$_B$. An output signal from the OR gate 370 is supplied as the request signal REQi to the priority controller (FIG. 1 or 4). It should be noted that the OR gate 370 need not be used when the priority controller shown in FIG. 5 is used as a two-input priority controller.

Now assume that the 8-input priority controller (FIG. 1) is combined with the 2-input priority controller (FIG. 5) so as to arrange a 16-input priority controller. In this case, the priority controllers shown in FIGS. 1 and 5 are arranged in each of the request circuits "i$_A$" and "i$_B$". The acknowledge signal ACK from the COMP 130 (FIG. 1) is supplied as the signal X to the NAND gate 320 and the AND gates 350 and 360. The output from the OR gate 370, i.e., the logical sum of the request signals REQi$_A$ and REQi$_B$, is supplied as the request signal REQi to the priority controller shown in FIG. 1. In this sense, the priority controller shown in FIG. 5 is regarded as a single request circuit. When the priority controller shown in FIG. 1 accepts the request signal REQi from the OR gate 370 of this request circuit, the acknowledge signal ACK of logic level "1" is generated from the COMP 130, and this acknowledge signal ACK is supplied as the signal X to the priority controller shown in FIG. 5. As a result, the acknowledge signal is produced from either AND gate 350 or 360 at the leading edge of the signal X (i.e., the acknowledge signal ACK). In this case, when the $Y_0$ output from the ROM 300 is at logic level "1" (i.e., when the request signal REQi$_A$ has a higher priority than the request signal REQi$_B$), the AND gate 350 supplies an acknowledge signal ACKi$_A$ to the request circuit "i$_A$". However, when the $Y_0$ output from the ROM 300 is at logic level "0" (i.e., when the request signal REQi$_B$ has a higher priority than the request signal REQi$_A$), the AND gate 360 supplies an acknowledge signal ACKi$_B$ to the request circuit "i$_B$". The $Y_0$ output from the ROM 300 is stored into the register 330 at the leading edge of the output from the NAND gate 320 (i.e., at the trailing edge of the reference clock signal CLK) for a time interval during which the request ON signal REQON and the signal X are at logic level "1". Every time the content of the register 330 changes, the $A_8$ input to the ROM 300 changes, thereby changing the priority in the ROM 300 as previously described. The content of the register 330 changes only when the priority controller shown in FIG. 5 has a priority, i.e., when the acknowledge signal ACK as the signal X becomes valid (logic level "1"). Therefore, a change in priority does not always occur simultaneously with a change in priority in the ROMs 121 and 122.

According to the embodiment described above, since the two types of priority controllers are cascade-connected, a large priority controller can be obtained.

The present invention is not limited to the particular embodiments described above. Various changes and modifications may be made within the spirit and scope of the present invention. For example, data given solely in accordance with the input data, may be used in place of the ROMs 121, 122 and 300. In the embodiments described previously, priority is equally assigned to the request circuits. However, a high priority level may always be given to a significant request circuit, with equal priority levels being assigned to the other request circuits.

What is claimed is:

1. A priority controller of the type which selects a request signal from request signals simultaneously produced by plural independent request circuits, said controller comprising:
  register means for storing information identifying one of said request circuits which has been granted the highest relative priority at a first instant in time;
  priority encoder means, connected to receive first and second sets of request signals produced by said request circuits, each set of signals consisting of the same number of request signals, and also connected to receive the information stored in said register means, for producing information according to the request signals and the information stored in said register means, said information identifying one of said request circuits which is to be granted the highest relative priority at a second time later than said first time, said priority encoder means comprising:

first ROM means for producing predetermined indicia selected as a function of first address data applied thereto obtained by combining a portion of information stored in said register means with each of said request signals, said portion excluding a first predetermined bit of said information stored in said register means, second ROM means for producing predetermined indicia selected as a function of second address data applied thereto obtained by combining said portion of information stored in said register means with information obtained by exchanging the positions of the first and second sets of request signals, said first and second ROMs producing the same indicia when the same address data is applied thereto, and output means for selecting the predetermined indicia produced by a selected one of said first and second ROM means, the selected indicia indicating the request circuit having the updated highest relative priority, said output means including means for selecting between the indicia produced by said first and second ROM means in accordance with information stored in said register means; and controlling means for controlling said register means to store the information produced by said priority encoder means at said second time.

2. A priority controller according to claim 1, wherein said first and second ROM means each produce indicia including a second predetermined bit which takes on a first logic level when the request signals produced by said request circuits all are inactive, and takes on a second logic level different from said first logic level when at least one of the request signals is active, each of said request signals having at least an active and an inactive state.

3. A priority controller according to claim 2, wherein said first ROM means has a first chip enable terminal which is connected to receive the first predetermined bit of information, and said controller further includes inverting means, also connected to receive said first predetermined bit of information, for applying an inverted version of said first predetermined bit to a second chip enable terminal of said second ROM means.

4. A priority controller according to claim 1, wherein said output means comprises:

wired-OR means for connecting the indicia produced by said first ROM means to corresponding indicia produced by said second ROM means; and for producing data at an output thereof in response to the combination of indicia produced by said first and second ROM means;

input means for applying a portion of the data produced at the output of said wired-OR means to said register means, said portion excluding a predetermined bit of data produced by said wired-OR means; and exclusive-OR means, connected to receive both the first predetermined bit of information produced by said register means and the predetermined bit of data not applied to said register means by said input means, for applying to said register means exclusive-ORed output obtained from the inputs thereof.

5. A priority controller according to claim 2, wherein said register means comprises a register which has a timing signal input terminal adapted for receiving a holding timing signal produced by said controlling means.

6. A priority controller according to claim 5 wherein said controlling means comprises gating means, connected to receive a reference clock signal and a busy signal, for gating the reference clock signal to the timing signal input terminal of said register to produce said holding timing signal in accordance with the second predetermined bit of one of the outputs of said first and second ROM means and with a busy signal, said busy signal indicating a busy/ready state of a common device accessible by all of said register circuits, said priority controller arbitrating access to said common device in accordance with the relative priority of said plural request circuits.

7. A priority controller as in claim 1 further including comparator means for selecting the request signal produced by the request circuit having the updated highest relative priority in accordance with the information produced by said priority encoder means to thereby arbitrate access to a common device accessible by at least one but not all of said plurality of request circuits at once.

8. A method of selecting one request signal from request signals simultaneously produced by plural independent request circuits comprising the steps of:

(1) storing, in a register, information identifying a one of plural request circuits which has been granted the highest relative priority at a first instant in time;

(2) granting priority to a requesting one of said plural request circuits at a second time later than said first time in response to first and second sets of request signals produced by said plural request circuits, each set of signals consisting of the same number of request signals, and also in response to the information stored in said register by said storing step (1), including the steps of:

(a) combining a portion of the information stored in said register by said storing step (1) with each of said request signals, said portion excluding a first predetermined bit of said information stored in said register, to produce first address data, (b) combining said portion of information stored in said register with information obtained by exchanging the positions of said first and second sets of request signals to produce second address data, (c) applying said first address data to the address inputs of a first read only memory, (d) applying said second address data to the address inputs of a second read only memory having contents identical to the contents of said first read only memory and producing at a data output thereof the same indicia as said first read only memory produces at a data output thereof when identical address data is applied to the address inputs of said first and second read only memories, (e) selecting one of indicia produced at the data output of said first read only memory and the indicia produced at the data output of the second read only memory in response to information stored in said register, and (f) sending a signal granting priority to one of said plural request circuits in response to the indicia selected by said selections step (e) at a second time later than said first time; and controlling the register to store information identifying the request circuit granted priority by said signal sending step (f).

* * * * *